United States Patent [19]

Fell

[11] Patent Number: 5,058,957

[45] Date of Patent: Oct. 22, 1991

[54] RECYCLABLE WASTE SORTER COLLECTOR

[76] Inventor: Donald M. Fell, R.D. #3, Box 23 E, Howard, Pa. 16841

[21] Appl. No.: 506,252

[22] Filed: Apr. 9, 1990

[51] Int. Cl.$^5$ ............................................. B60P 1/00
[52] U.S. Cl. ................................... 298/24; 220/908; 232/43.1
[58] Field of Search .................. 298/1 V, 24; 296/184; 232/43.1; 414/406, 408, 414, 518, 537; 160/210, 229.1; 220/500, 503, 908, 909

[56] References Cited

U.S. PATENT DOCUMENTS

| | | | |
|---|---|---|---|
| 833,761 | 10/1906 | Stevens | 298/1 V |
| 992,006 | 5/1911 | Kubersky et al. | |
| 1,618,366 | 2/1927 | Culling | 232/43.1 X |
| 1,658,880 | 2/1928 | Brunetti | 232/43.1 |
| 1,896,691 | 2/1933 | Winchell | 160/229.1 X |
| 2,906,557 | 9/1959 | Garabedian et al. | 296/184 |
| 3,080,196 | 3/1963 | Darby | 298/24 X |
| 3,083,057 | 3/1963 | Kiser et al. | 298/24 |
| 3,893,615 | 7/1975 | Johnson | |
| 4,114,776 | 9/1978 | Pluss | |
| 4,676,431 | 6/1987 | Teske et al. | 220/908 X |
| 4,840,531 | 6/1989 | Dinneen | 414/409 |
| 4,953,744 | 9/1990 | Koyama | 220/908 X |

FOREIGN PATENT DOCUMENTS 3625995 11/1988 Fed. Rep. of Germany .

OTHER PUBLICATIONS

Brochure Side Dump (Curb Sorter), Stephenson Equipment, Inc., Harrisburg, PA.
Brochure Frick Recycling Unit, Frick America, Clayton, NY.
Brochure C.R.C.V., Able Body Co., Newark, CA.
Brochure Eager Beaver Low Profile Recycler, Eager Beaver, Thorofare, NJ. Brochure Ampliroll, Marrel Corporation, Hendersonville, TN.

Primary Examiner—Robert J. Spar
Assistant Examiner—Craig Slavin
Attorney, Agent, or Firm—James Creighton Wray

[57] ABSTRACT

A container for sorting and collecting of recoverable waste products has fixed partitions providing discrete compartments for those products. Each compartment incorporates its own independently sloped floor. At the bottom of the slope of each compartment is an exteriorly communicable door which allows for unloading of the container without the tipping of the container. Loading doors at the tops of the compartments allow for easier loading of the container. The rear compartment has a rearwardly opening unloading door, while the intermediate and forward compartments preferably open and unload through side doors. The top of the structure is open for loading. A cover and connection between the apparatus and the cover is disclosed herein. The container is made to tow behind a powered vehicle and is mounted upon an undercarriage with wheels.

22 Claims, 7 Drawing Sheets

RECYCLABLE WASTE SORTER COLLECTOR

BACKGROUND OF THE INVENTION

This invention deals with equipment for recycling waste for truck and trailer products. Prior art devices have not successfully dealt with the problems of collection and sorting. The present invention discloses a novel apparatus which deals with the problems previous inventions and practices have not solved. Examples of prior art are included to show the state of the art.

U.S. Pat. No. 922,006 describes a hopper with multiple bins or compartments that dump via sliding or hinged doors at bottoms of the bins. The disadvantages of that hopper are: a) If mounted on a trailer, special trailer design provisions must be made so as not to drop waste on axles and tires. b) There must be a hopper or conveyor below grade to remove waste from under the trailer. c) The design limits maximum height to about five feet so that a person can dump materials into the top-loading device). d) A crane or hoist is required to raise the entire unit over appropriate stationary containers, and each bin must be dumped separately. That device is designed for collection of one to a few number of households' waste, and is not designed as a vehicle or container to transport large number of households' waste.

U.S. Pat. No. 3,893,615 describes multiple bins or compartments, with each bin holding a plastic refuse bag or garbage can. That device is intended as on-site refuse receptacle that is animal proof. That device is limited by size (about 30 to 55 gallons per bin) and must be unloaded by manually removing the bags or cans via side doors. That device is for the collection of a few households' waste, and is not a vehicle or container to transport large number of households' waste.

German Patent 36 25 995 describes another on-site collection container and not a collecting vehicle. It is limited to 2 bins of equal size, and to bottom unloading, which requires a crane to lift and dump.

U.S. Pat. No. 4,114,776 is also a multiple bins collection container, for use as collection site or center. It requires crane to dump and unload. If it were mounted on a truck or trailer, it would require a hydraulic ram to incline the unit or dump it. Each bin must be dumped in successive order, and all unload from one end.

Products in use also show a need for the present invention.

The Curb Sorter (TM) Side Dump has a group of bins mounted on a trailer or truck chassis. Each bin has a hydraulic ram and mechanics to cause dumping of bin into another container.

The Frick recycling unit is group of bins within a box mounted on the truck chassis. Each bin dumps progressively by use of a hydraulic pump, cylinder and mechanics.

The Able Body Company's CRCV is similar to the Curb Sorter, except that unit is truck chassis mounted and can hydraulically dump in a direction of a customer's choice, to the rear or side.

The Eager Beaver unit is available in trailer and truck chassis models and it progressively dumps each bin, one at a time.

The AMPLIROL is waste industry standard roll-off container and truck chassis mounted hydraulic system, which loads the roll-off container onto truck or trailer.

The present invention is for use on a trailer frame or truck chassis, and is unique to the waste resorting/recycling industry as will be described in the ongoing specification.

SUMMARY OF THE INVENTION

The present invention is a container for collecting and sorting of recyclable waste.

It is noted in the ongoing specification that "container", "collector" and "sorter" are synonymous and are interchangeable.

A container of substantially rectangular shape has a solid bottom, forward and rear walls and first and second side walls.

The container has plural fixed partitions transversely connected from the first side wall to the second side wall to thereby define plural discrete compartments within the container.

These individual compartments incorporate sloped floors and external doors in the sides of the container. The doors are specific to the individual compartments to thereby provide intercommunication with the exterior of the container. At least one of the doors is positioned adjacent the bottom of the container.

A sloped floor of each compartment is provided by an inclined plane extending from the bottom of one wall to an elevated portion of the opposite wall. The door located adjacent the bottom of each compartment abuts at the lower portion of the inclined plane to provide a means for intercommunication with the exterior of the collector at the lowest part of the inclined plane.

The container further has forward and rear compartments, at least one of which is intercommunicable with the exterior through a door mounted on the forward wall or rear wall. The door is positioned adjacent the bottom of the container. The compartment has an inclined floor extending from an apex on a fixed partition downward towards the bottom of the rear or front wall adjacent the placement of the rear or front door.

The container further has individual compartments having sloped floors and individual doors communicating with the exterior. At least one of the doors is provided adjacent the bottom of the slope of the floor of the compartment to provide a chute for emptying the compartment.

The inclined plane of the sloped floor has a fixed angle of inclination to thereby provide a slope sufficient for emptying a particular type of recyclable waste. The coefficients of friction for different wastes require different inclines for emptying the material through the door adjacent the lower portion of the sloped floor.

The compartments adjacent the forward and rear walls are the forward and rear compartments, at least one of which incorporates a floor sloped downward from a fixed partition towards the bottom of the forward or rear wall. The rear or front wall of such a compartment has a door positioned therein.

The forwardly or rearwardly opening compartment further incorporates at least one door in the side walls for loading the compartment.

A forward compartment not incorporating a forwardly opening door has a side to side sloped floor and, as the compartments intermediate the forward and rear compartments, has a single door adjacent the bottom of the sloped floor.

Each container compartment further has at least one door for loading positioned on at least one side of each compartment for loading.

The loading doors are bottom hinged, opening exteriorly and projecting 180° downward to rest against the exterior sides of the containers in the open position.

These doors incorporate a first hinge between the door and the container. The loading doors are either of singular construction or, alternately, have a second hinge positioned parallel above the first hinge to divide the loading door into two panels. The single and double hinged loading doors have latch means for engaging the side walls proximal the point nearest the tops of the panels and the sides of the container. A disengagement of the latch means allows the manually activated 180° outward rotation around the single-hinged on the single hinge door or the upper hinge on the double-hinged door.

The double hinged door has a second side engaging latch means located proximal to and below the upper hinge on the second panel. The disengagement of the second engaging latch means provides means for a 180° projection of the second panel of the door intermediate the first and second hinges.

The double-hinged doors allow a user to adjust the size of the loading aperture as described by loading door openings.

Preferred, rearward or frontward opening unloading doors are top-hinged and open towards the exterior. These further incorporate a flange integral with the bottom of the door. The flange extends inwardly toward the bottom of the container and underlies an end portion of the bottom of the container for substantially the whole length of the rearward or the forward compartment, when the door is in the closed position. Alternately the flange forms a portion of the bottom of the container.

A winch or other device may be included to assist in opening and closing the top-hinged forwardly or rearwardly positioned door is provided between the container and the door.

Preferably, the container has an open top. The upper edges of the side, rear and forward walls are provided with means for engaging the edges of a cover for closing the top of the container's compartments.

Fold-out steps can be attached to the exterior of the container near the bottom of the container walls.

The fixed partitions can alternately extend upwards beyond an imaginary plane created by the upper rim of the side walls and rear and forward walls. These extensions of the fixed partitions provide added storage space between the containers and further provide sloping tarp frames for covering of the top of the container. The fixed partition extensions are preferably trapezoidal structures that provide an appropriate framework for the container cover or tarp.

A preferred container has five compartments. The rear compartment incorporates a rearward opening door adjacent the bottom of the slope in the rear compartment. The front compartment and three intermediate compartments have floors sloped towards the sides of the container. Two of these compartments unload on one side of the container, while the other two compartments unload on the second side of the container.

Another container has four or six individual compartments. The rear compartment of the container incorporates a rearward opening door positioned adjacent the sloping bottom of the floor of that compartment. The forward compartment either incorporates a forwardly opening unloading door for a forward and downward sloped floor for that compartment, or alternately, a side opening unloading door for a side to side sloped floor. Four intermediate compartments, have side to side sloped floors and side unloading doors adjacent the bottom of the slopes. Two of the intermediate compartments unload on one side of the container while the other two compartments unload on the opposite side.

The container is preferably a mobile collector mounted on trailer frame, on truck chassis, or as a separate unit that can be detached, rolled-off and left as on-site collection center for collecting and sorting of recyclable waste. The sorter incorporates a means attached to forward wall of the container for engaging and being towed by a powered vehicle, and at least one axle positioned on the bottom of the container for allowing the container to be towed by the powered vehicle.

Other advantages and features of the invention will be apparent from the disclosure, which includes the above and ongoing specification with the claims and the drawings.

DETAILED DESCRIPTION OF THE DRAWINGS

Figure 1:
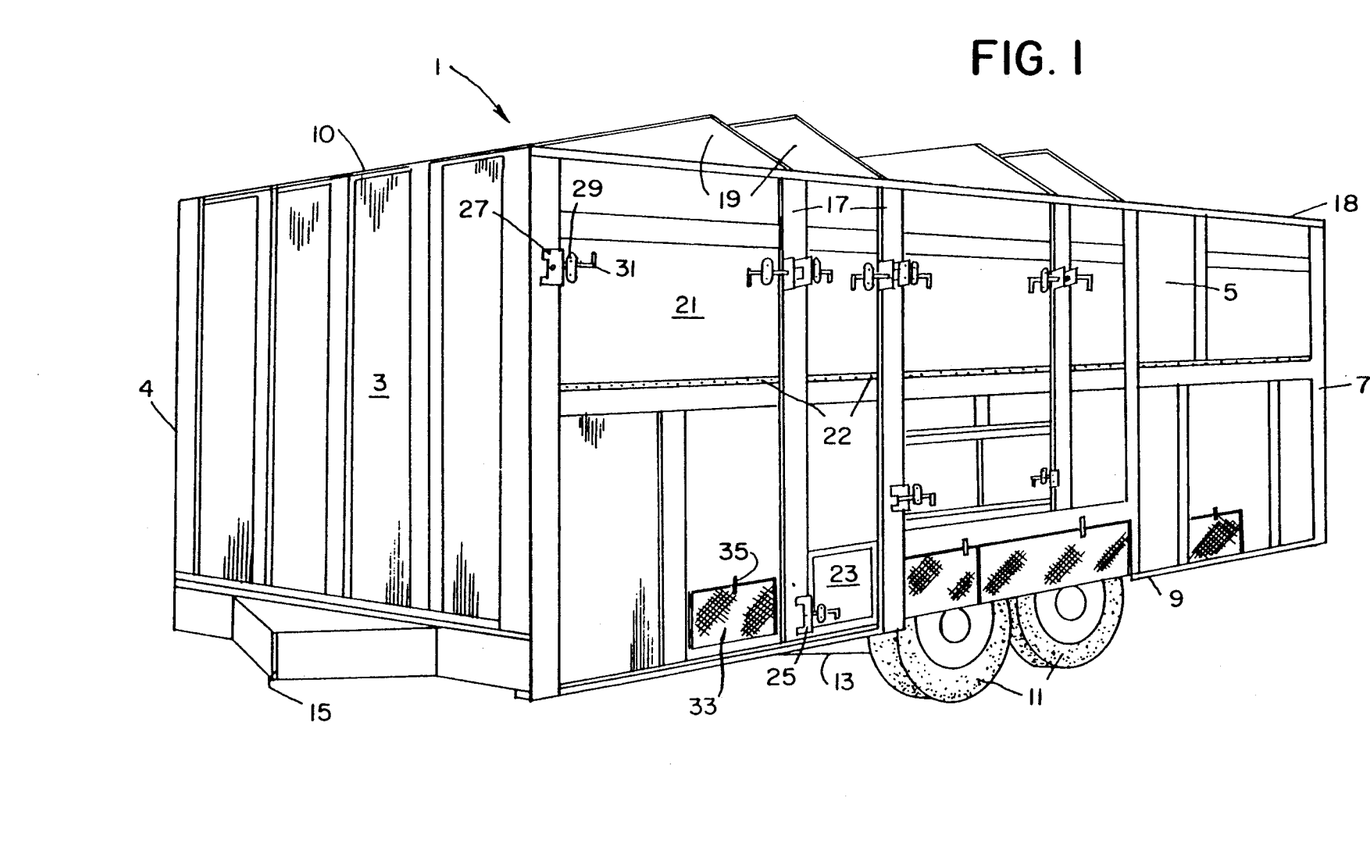
FIG. 1 is a forward and left side perspective view of the of the preferred embodiment of the container.
Figure 2:
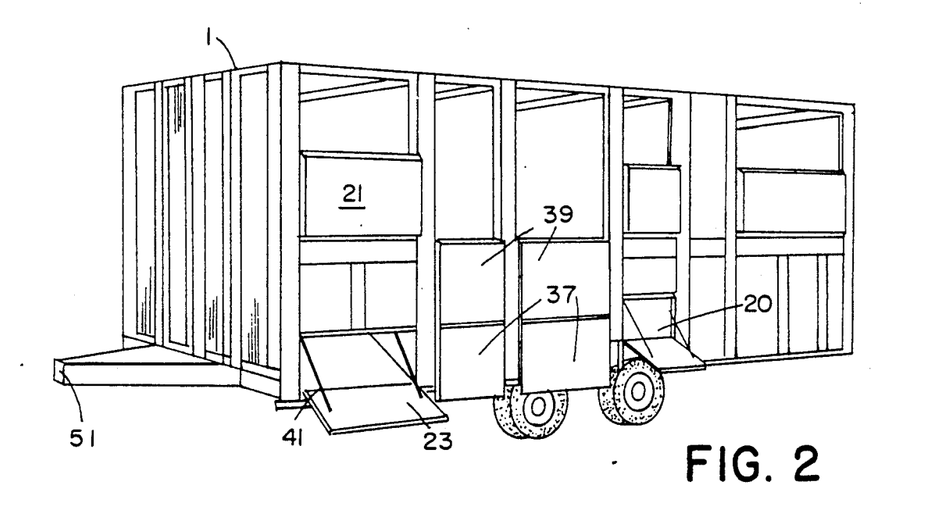
FIG. 2 is a perspective view of the container, showing the loading and unloading doors in the open positions.
Figure 3:
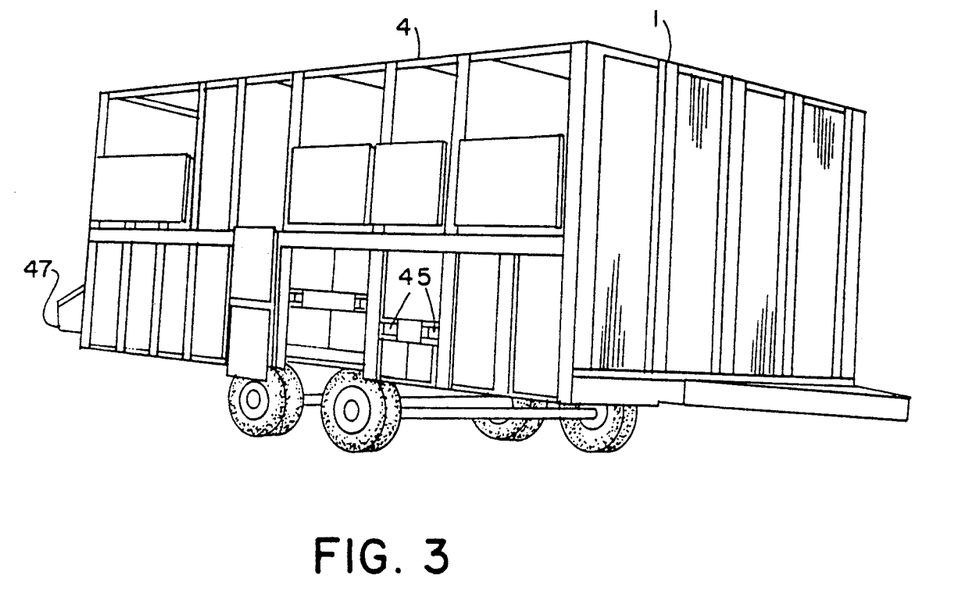
FIG. 3 is a perspective view of the opposite side showing open loading doors and closed unloading doors having alternate door engaging latches.

FIGS. 1–3 are perspective side and front views which show the general configuration of the present invention. The collector 1, for the sorting and collecting of recyclable waste materials along product lines is generally of a rectangular structure having a forward wall 3, right side 4, left side 5, rear side 7, bottom 9 and an open top 10. The container 1 is preferably of a solid metal, fiberglass or plastic construction typical to the waste container industry. The container is preferably mobile; it is attached to an undercarriage 13 having wheels 11. The wheel and undercarriage combination thereby allow the collector 1 to be drawn by a powered vehicle which tows the collector through a powered vehicle engaging hitch 15 attached to the forward wall 3 of the collector.

Figure 5:
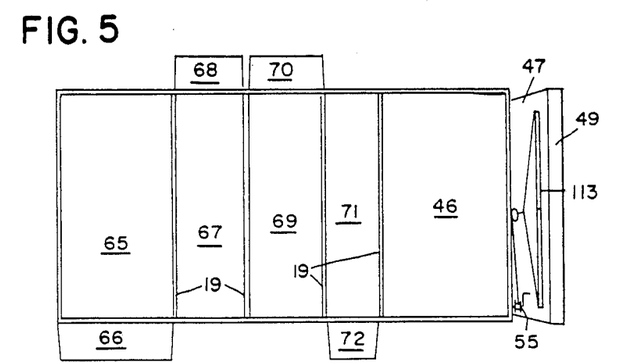
FIG. 5 is a top view of the preferred container showing the bins and the respective unloading doors.

The container incorporates fixed partitions 17 transversely affixed to the right and left sides of the container to thereby divide the container into fixed compartments, as shown in FIG. 5. The fixed partitions preferably have partition extensions which extend upwards above an imaginary plane as described by the upper rim 18 of the container. These partition extensions 19 provide a support structure for a tarp or similar flexible cover, or solid cover of metal, fiberglass or plastic; which attaches to the upper rim 18 and drapes over the partition extensions 19 to provide a tent-like cover for the collector 1. It is preferred that these extensions be trapezoidal in shape, but it is not beyond the scope of this invention to include other shapes suitable for the particular needs of other situations. Further, these partition extensions 19 also provide added collection space in the compartments. The upper rim 18 can employ several tarp or cover engagement means, including loops for receiving hooks attached to the tarp or vice versa. The rim is similar to a bar running lengthwise atop the right and left sides of the container to thereby provide several attachment means for the tarp. However, any typical engagement means between the tarp and the upper rim is not beyond the scope of the present invention.

As shown in FIGS. 1-3, the compartmented collector has plural side doors, some of which are for loading, while others are for unloading. The rear compartment of the container empties through a rearwardly opening door. The forward compartment may and all the intermediate compartments must incorporate side loading doors 21 and side unloading doors 23. These side unloading and loading doors open outward from the right and left sides of the container. The side loading doors 21 are bottom hinged with hinges 22 and fold outward and downward 180° to rest against the sides of the container, when in an open position. Similarly, the side unloading doors 23 can be either top hinged or bottom hinged, according to the specifications of manufacture. The loading doors are positioned proximal the top 10 of the container, while the unloading doors are positioned near the bottom 9. The side doors, 21 and 23, incorporate side door engaging latches 25, which generally allow the user to selectively lock the doors in the closed position or alternately, unlock the doors to allow loading or unloading. Although any means is suitable for locking the door in the closed position, a preferred embodiment includes a bolt 31 within a sleeve 29 attached to an edge of the door. A receiving shoe 27 is oppositely attached to a proximal edge of the side of the collector. A movement of the side door engaging bolt 31 within the sleeve 29 towards the shoe 27 slips the bolt 31 within the shoe 27 to thereby lock the door in the closed position. FIG. 3 shows an alternate side door engaging means 45 having a pull handle with an internal locking means.

The collector 1 alternately incorporates a step or step-up means 33 attached to the side of the collector for enabling easier access to the collector. The step 33 is retractable and folds against the side of the container and is held in place by a step clasp 35. These retractable steps can also function as doors for hidden compartments as described by the partitions, the bottom of the collector, and sloped floors for the individual compartments.

Although the preferred embodiment of the present invention is mounted upon an undercarriage for being towed by a self powered vehicle, the scope of the invention does not limit the invention to a mobile container for collecting and sorting of recyclable waste. The invention could alternately have means for being lifted and carried on the bed of a truck. It is not beyond the scope of this invention to mount the present invention upon a platform for being placed in a parking lot or similar situations for on-location usage, maintenance and collection.

FIG. 2 shows the operation of the side doors. The doors are shown in the open position. The side unloading doors 23 are preferably bottom hinged and open outward to a fixed position and are held there by unloading door cables 41 which are attached to the doors and to sides of the container. Individual slopes 20 provide differing inclines for each compartment within the container for the different co-efficients of friction of the sorted materials within the containers.

The loading doors 21 can be of single panel construction, or alternately of double panel construction, as shown in FIG. 2. With the double panel construction, the doors have a first loading door panel 37 attached to a second loading door panel 39, which is attached to the side of the container. The typical attachments therein are longitudinal hinges, which allow rotational movements therebetween. The hinged panel in the loading door allows for selective opening of the first door or alternately both doors to enable the user to vary the size of the loading openings.

FIG. 3 shows the side view opposite to that shown in FIG. 2, with alternate side door engaging means 45 and the open rear compartment unloading door 47. FIGS. 4A–4D show perspective side view details of the rear compartment 46. The rear compartment incorporates at least one loading door 53 positioned on the side or sides of the container. The rear compartment loading doors 53 are similar in function and in construction to the intermediate and forward compartment loading doors. Dissimilar to the unloading doors of the intermediate compartments, however, the rear compartment unloading door 47 opens from the rear 7 of the container. The door 47 swings around a longitudinal hinge 50 and rotates exteriorly through the actuation of cable 56. The cable is wound on winch 55 by cranking handle 57. The cable 56 passes through pulley 59 and is connected to ring 101 to form yoke with two cables 61 of equal length. Cables 61 are attached to left and right side of door 47 with hooks 100. The pulley 59 is located near center of rear 7 of the container. By winding cable 56 onto winch 55, the door 47 is rotated, evenly lifting both left and right sides of door 47 the same.

To secure door 47 during use and transport, two latches 105 and 106 are fastened to lower left and right side of door 47, and catches 103 are mounted to corner post at rear 7 of the container. Another cable 113 is attached to end of both latches 105 and 106. This cable 113 is attached to left latch 105 and passes through left mounted tube 107, through handle tube 111, through right mounted rube 109 and connected to right latch 106. The left tube 107 and right tube 109 are mounted to door 47 with brackets 115. The handle tube 111 is free to move on cable 113 between the ends of the left tube 107 and right tube 109, at mounted brackets 117 and 119 respectfully. By manually pulling on handle 111, both latches 105 and 106 are released from catches 103. The latches 105 and 106 are spring loaded and will self-engage in catch 103 with closing of door 47.

Figure 4A:
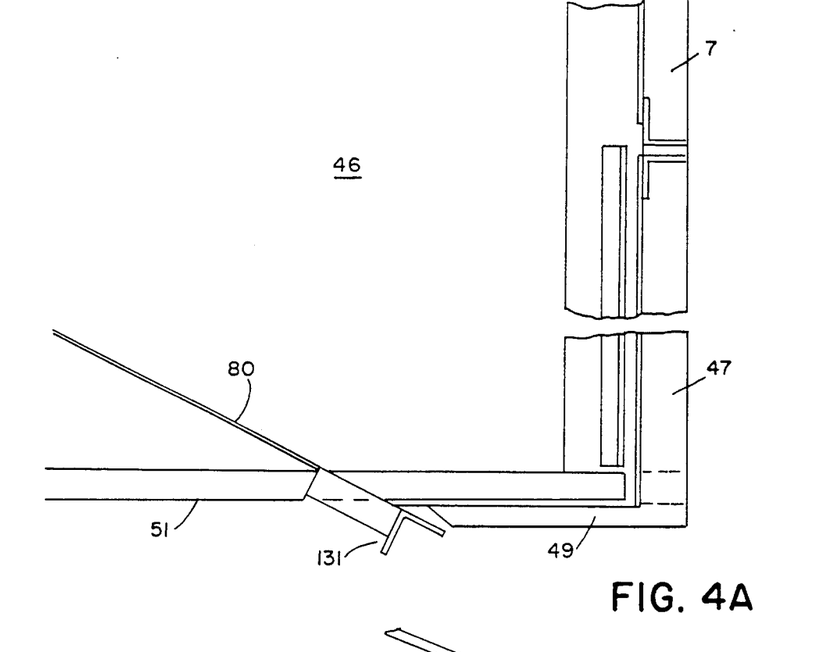
FIGS. 4A, 4B, 4C and 4D are views of the rear compartment showing the rear door.
Figure 4B:
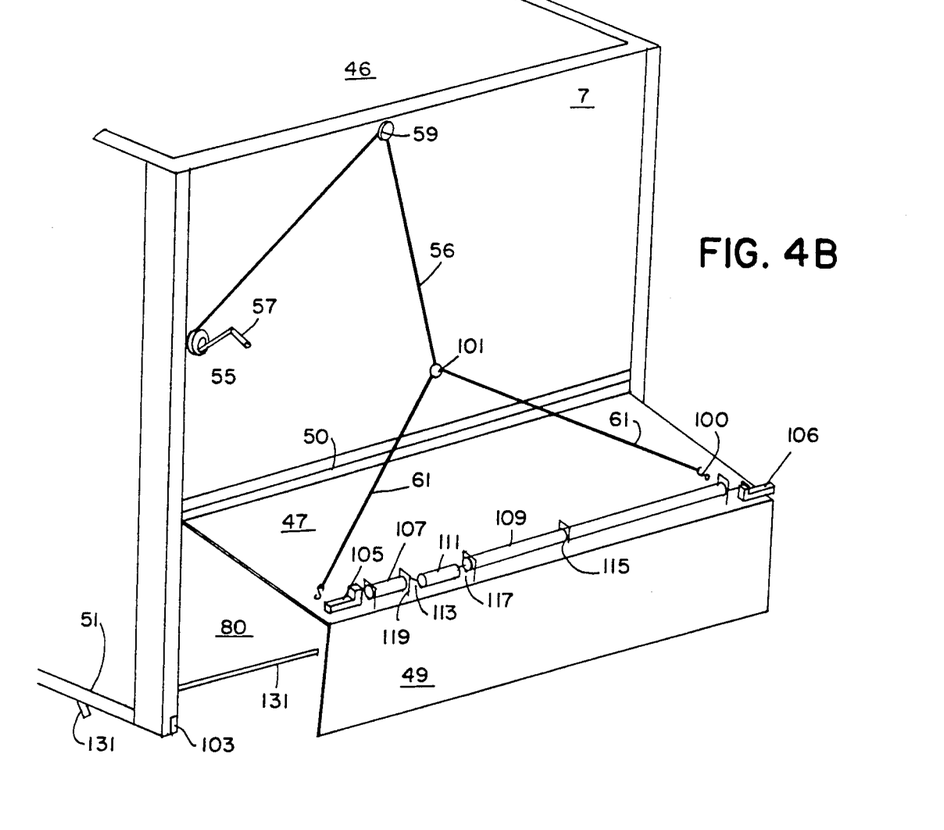
Figure 4C:
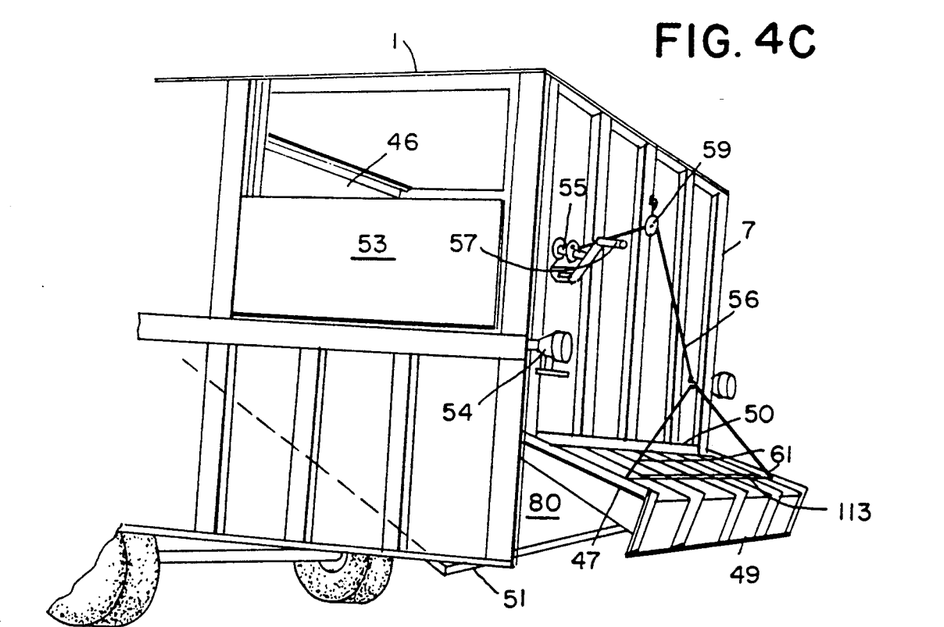
Figure 4D:
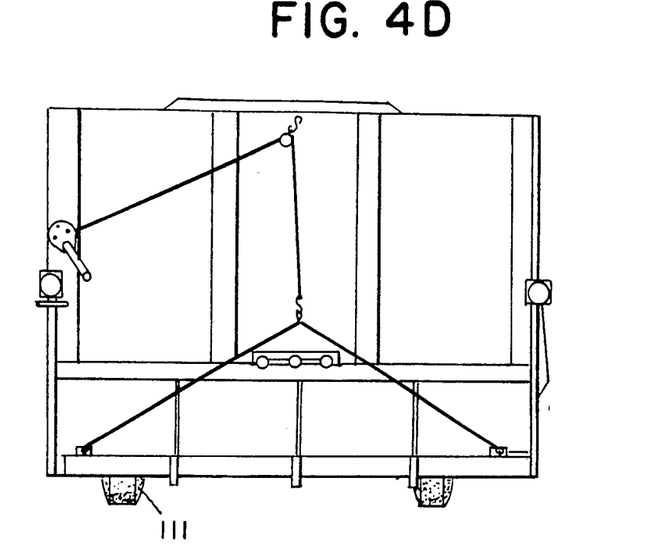

From FIGS. 4A–4C, the lower edge of slope 80 in bin 46, ends at support 131, just below side 51. As the rear door 47 is closed, the door L-extension 49 rotates into closed-position and abuts or rest on support 131. The bottom of rear bin 46 is comprised of slope 80 and rear door L-extension 49. When the rear door 47 is opened, the door extension 49 is rotated out of position, and the contents of bin 46 dump since part of bin bottom is removed. Rear tail lights 54 are attached to the rear 7 of the container above the rear door hinge. Conventional truck and trailer running lights are attached.

FIG. 5 shows the preferred invention from a top view wherein all of the respective compartments have their unloading doors opened. The preferred embodiment has five individual compartments. The forward compartment 65 preferably has a side opening door 66 and is similar to the intermediate compartments in that respect. In alternate embodiments, however, the forward compartment can open in a fashion similar to the rear compartment 46, and other intermediate compartments can be added. In the preferred embodiment, first intermediate compartment 67, second intermediate compartment 69, and third intermediate compartment 71 have individual respective unloading doors 68, 70, and 72 respectively. It is preferable that the number of unloading doors on each side be equal to allow equilibrium of the container during waste procedures. Thus, the user can unload the container from alternate sides to maintain this equilibrium. This further provides a balancing during towing.

Figure 6:
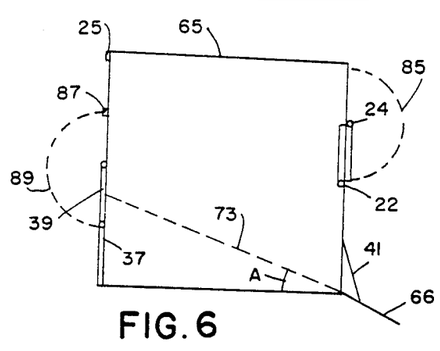
FIG. 6 is a cross sectional view of an individual compartment having a sloped floor with angle A and respective unloading and loading doors, the operation of which is shown therein.
Figure 7:
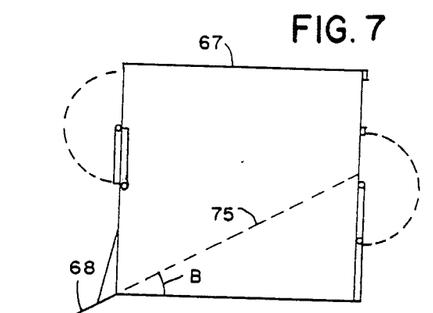
FIG. 7 is a cross sectional view of an individual compartment having an inclined slope with an angle of B.
Figures 8, 9, 10:
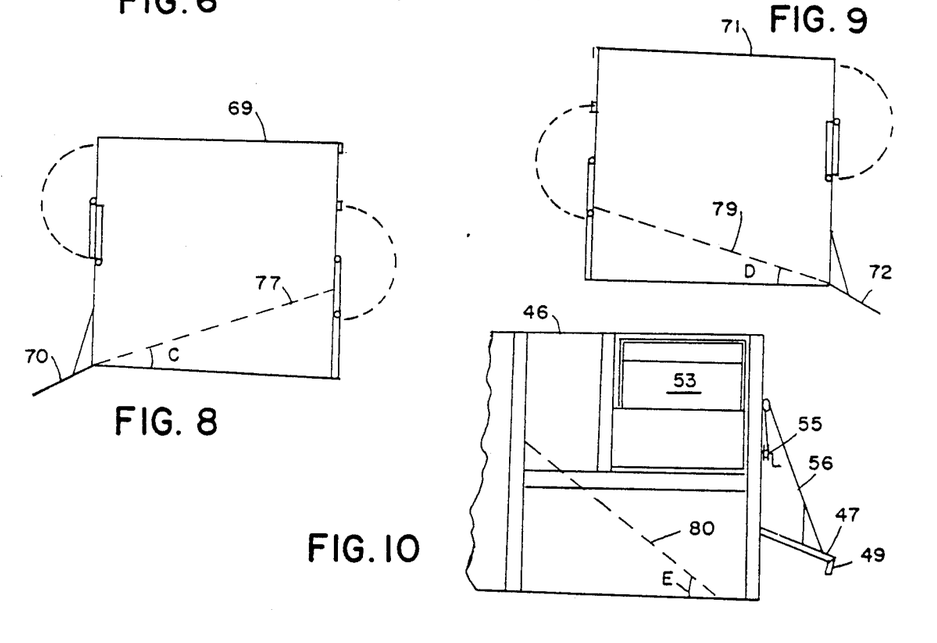
FIG. 8 is a cross sectional view of an individual compartment having an inclined slope of angle C.
FIG. 9 is a cross sectional view of an individual compartment having an inclined slope of angle D.
FIG. 10 is a side view of a rear or forward compartment showing the operation of the unloading door and a sloping floor of angle E.

FIGS. 6–10 disclose one object of the present invention. Different materials which are recoverable require different angles of inclination before they freely flow outward from the chutes as controlled by the unloading doors in the respective compartments. Glass or metal do not require the angle of inclination that paper or similar articles require. Thus, it is an object of the present invention to provide the separate compartments as divided by the partitions with differing sloped floors to provide different inclined planes suitable for recoverable materials to slide out of the chutes as described by the door and the plane. FIG. 6 shows a preferred angle A of 22° providing a slope 73 for cans and metals in forward compartment 65. FIG. 7 shows a angle of inclination B of 30° for colored glass on slope 75 of compartment 67. FIG. 8 shows a angle of inclination of 20° for waste plastics on slope 77 of compartment 69. FIG. 9 shows an angle of inclination of 16° for glass on slope 79 of compartment 71. FIG. 10 shows an inclination of 37° for paper on slope 80 of rear compartment 46. The rear compartment is typically the largest compartment on the container and is thus, most suitable for paper and other similarly bulky items, which typically require the higher angles of inclination for dumping. While the aforesaid angles and their respective compartments are matters of practice in the present invention, other angles and inclined planes are fixed in manufacture for the suitable materials to be sorted. These angles are not to be restricted by the disclosure to the respective compartments, nor are the specific angles the only angles covered by the disclosure of the present invention. Other angles not mentioned are not beyond the scope as described herein.

FIG. 6 further shows the operation of the double hinged loading door having a first panel 37 and a second panel 39 which when in the closed position is locked by side loading door engaging latch 25. A disengagement of the side door engaging latch 25 causes a first rotational movement of the first panel 37 through the first path 85 around an intermediate loading door hinge 24. A second side door engaging latch 87 still holds the second loading door panel 39 in place and limits the size of the loading opening. The disengagement of the second engaging latch 87 allows the second panel 39 to swing outward along a second rotational path 89 around the lower panel hinge 22. At the beginning of operation both panels are open. The bottom panel is closed after a bin has been partially filled.

Figure 11:
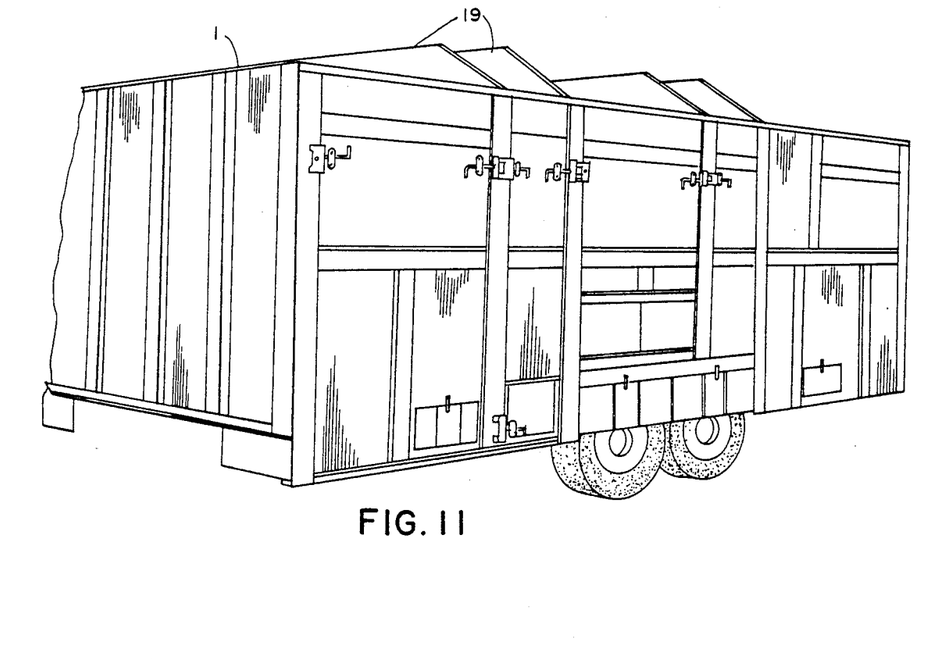
FIG. 11 shows a detailed perspective side and forward view of the preferred container of the invention.
Figure 12:
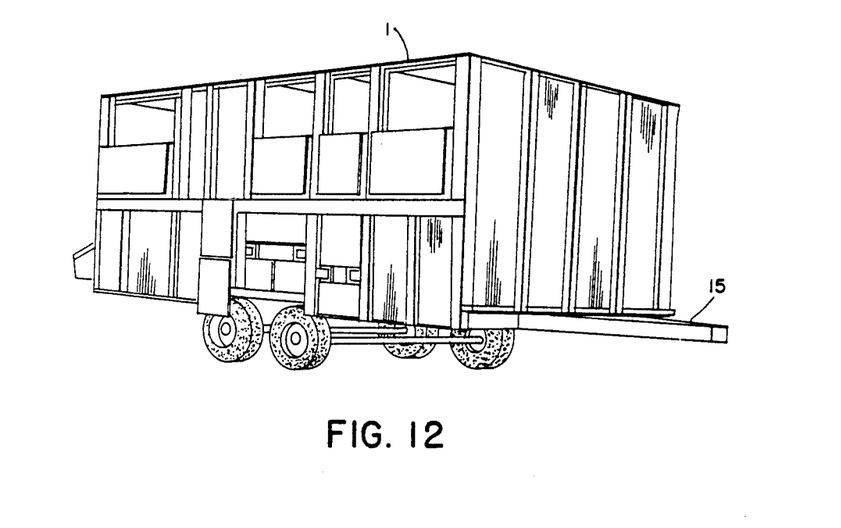
FIG. 12 is a detailed side perspective view of the present invention, showing all loading doors and the rear unloading door in the open position.
Figure 13:
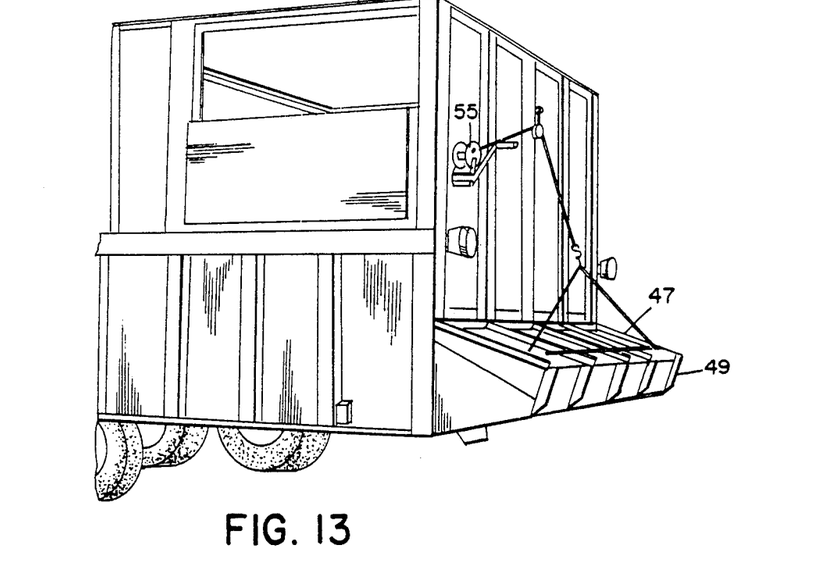
FIG. 13 is a perspective side view of the rear compartment showing the operation of the unloading door.

FIG. 11 is a detailed perspective view of the present invention in practice showing the upper rim, partition extensions, closed side unloading and single panel loading doors, panel hinges, side door engaging means, step, wheel, and powered towing vehicle engaging means. FIG. 12 is another perspective view showing the invention in practice with bi-fold loading doors The alternate side door engaging means, the double panel loading door, the powered vehicle hitch, the undercarriage and wheels, and rear open door are shown. FIG. 13 is a perspective view of the side compartment with open loading and unloading doors. The yoke, yoke attachment, cable, handle, spool and rear tail light 54 are shown.

Figure 14:
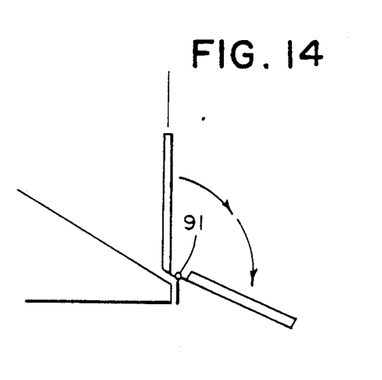
FIG. 14 is a detail side view of one embodiment of the side unloading doors.

FIG. 14 shows one embodiment of a side unloading door wherein a first hinge 91 is attached proximal the edge of the sloped floor.

Figure 15:
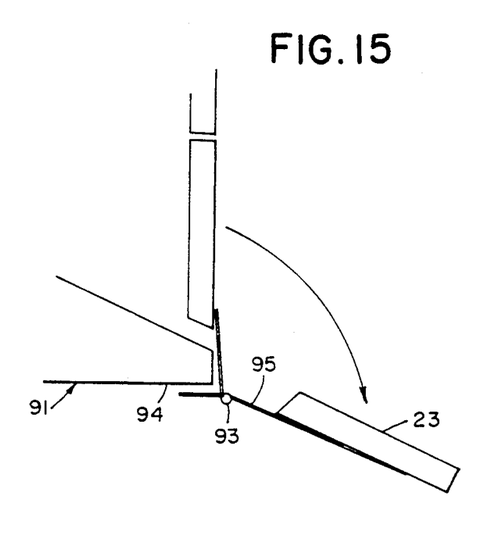
FIG. 15 is a detail side view of the preferred side unloading doors.

The preferred side unloading door, as shown in FIG. 15, is with pin hinge 93 affixed to the bottom edge 94 of the container 91 below and adjacent the opening of the individual compartment. The hinge has an extension 95 which attaches to the door 23.

The present invention has several advantages over the prior art. These include combining a number of bins of equal or unequal size, with lower low-profile "loading" doors (single and bi-fold door units) on both sides of trailers for easier loading, and "dump" doors which can be either top or bottom hinged. The bottom hinged "dump" door helps to chute waste away from bin and trailer or truck tires. The "dump" door for the rear bin, upon opening, removes portion of both rear and bottom of bin for easy dumping of "non-rolling . . . hard-to-dump products". The dump door of the rear bin is L-shaped and hinged at top, such that upon opening, sections of the rear and bottom of bin are swung outward.

The sorting and collecting unit allows for full-range to handle customer needs for pick-up and recycle.

The inclines of the floors of the bins are sufficient to dump contents of glass, metal or plastic bottles, containers, etc. The bins have angle of incline at 17, 21, 30 and 40 degrees, but are not limited to those angles and include other angles suitable for users' needs.

The bins are constructed to handle sufficient bulk, weight capacity and are sized to handle average waste pickups on average routes with excess or extra capacity for non-average pickup.

The unit requires no hydraulic or air power to dump the contents of bins, thus it does not require much maintenance.

The unit is equipped with tarping capacity or solid cover and DOT lighting.

Other improvements include: fixed partitions and fixed sloped floors; swing down loading doors of double or single hinged panels; side emptying doors swinging up, or down as a chute with single or two-pin continuous hinges. One large bin empties rearward with a large slope for paper or plastic. An additional large forward sloped bin may be added. Loading doors overlap partitions to widen across. Fold-up steps are provided where there are not emptying doors. Non-hydraulic, non-powered dumping provides low maintenance, low cost and Trapezoidal partition tops provide for tarp frames. Loading doors overlap lower tarp edges, or tops of door are just below the tarp edge.

The size of each compartment is fixed in manufacture, but design variations allow for various sized/-width (18, 22, 34, 36 46, 48 inches wide, etc.) compartments. The slope of each compartment is also fixed in manufacture, but design variations allow for variation of slope (16, 17, 20, 22, 30, 37 degrees of incline, etc.)

The emptying sequences is at option of the customer/waste hauler. If hauler fills rear bin with very heavy waste, it "may" be desirable to dump that bin first, or at least prior to last, such that there is not excess negative tongue weight on the towing vehicle. The reason for the inclines facing opposite directions is to balance load from left to right while trailer being towed, and when dumping to balance load from front to rear. It is envisioned that the Waste Station would dump in either following sequence, depending on which side of the Waste Station the bulk materials are to be stored (sequence A: 1st, 4th, rear, 2nd and 3rd bin) or sequence B: 2nd, 3rd, rear 1st and 4th bin). Four, Five and six compartments trailer, truck chassis and roll-off models are also available. It has similar dumping sequence and opposing includes to balance towing and dumping loads.

Examples of container construction include:
7-10,000 lbs. GVW, 18 cubic yards in 5 bins;
10-12,000 lbs. GVW, 23 cubic yards in 5 bins;
14-16,000 lbs. GVW, 28 cubic yards in 4-6 bins.

The above units are attached to either trailer frame, truck chassis, or roll-off frame.

While the invention has been described with reference to specific embodiments, modifications and variations of the invention may be constructed without departing from the scope of the invention, which is described in the following claims.

I claim:

1. A container for collecting and sorting of recyclable waste, comprising a receptacle of substantially rectangular shape having a bottom, forward and rear walls and first and second side walls;
   said container having plural fixed partitions transversely connected between the first side wall and the second side wall, thereby prescribing plural compartments within the container;
   said compartments incorporating sloped floors, said floors having different angles of inclination;
   said compartments also incorporating plural doors in the sides of each compartment of the container wherein the doors are specific to individual compartments to thereby provide intercommunication with the exterior of the container, at least one of said doors positioned adjacent the bottom of the sloped floor of the container for unloading;
   said sloped floor of each compartment provided by an inclined plane from the bottom of one side to an elevated portion at the opposite side wherein said unloading door hinged at the bottom of each compartment is located at the lower portion of the inclined plane to thereby provide a means for intercommunication at the lowest port of the inclined plane;
   said container further comprising forward and rear remote compartments, at least one of which is intercommunicable with the exterior through an outwardly opening door hinged on a lower end of a wall opposite from the fixed partition above the bottom of the container, wherein an inclined plane floor of said compartment slopes from an apex on the fixed partition downward towards the bottom of the wall adjacent the placement of the door.

2. The container of claim 1, wherein at least one of said doors is hinged at the bottom of the slope of the floor of the compartment to provide a chute for emptying the compartments;
   the inclined plane of the sloped floor of each of the individual compartments having a fixed angle of inclination different from that of adjacent compartments to thereby provide a slope sufficient for emptying a particular type of recyclable waste wherein the coefficients of friction for different wastes require different inclines for emptying the material through the door at the lower portion of the sloped floor.

3. The container of claim 1, wherein at least one of the forward and rear remote compartments incorporates a floor sloped downward from a fixed partition toward a bottom of the wall opposite to the fixed partition and toward the unloading door positioned at the lower end of the wall;
   said remote compartment further incorporating at least one door in a side wall for loading the compartment.

4. The apparatus of claim 3, further comprising a front or rear remote compartment not incorporating a door and wherein the compartments intermediate the forward and rear remote compartments having a single door hinged at the bottom of the slope of the incline plane;
   said intermediate compartments further having at least one door for loading positioned at a higher level than said bottom door on the side of each compartment for loading each individual compartment.

5. The loading doors of claim 3, further comprising bottom hinged loading doors which open towards the exterior of the container wherein some of the loading doors are single panels.

6. The loading doors of claim 5, further comprising some of the bottom hinged loading doors having second hinges positioned parallel the first mentioned hinges, thereby forming single and double hinged loading doors;
   said single and double hinged loading doors further having latches for engaging the side walls proximal points nearest the top of the side of the container wherein disengagement of the engaging means provides the 180° outward rotation as prescribed by the single hinge on the single hinge door or the second hinge on the double hinged door;
   said double hinged doors further having a second side engaging latches located proximal to and below the second hinges, wherein the disengagement of the second engaging latches provides a 180° rotation of portions of the doors intermediate the first and second hinges;

said first and second hinges on double hinge doors providing a means for adjusting the size of loading apertures.

7. The apparatus compartments of claim 3, wherein at least one of said rear and front remote compartments incorporates an outwardly opening unloading door, and further the door being a top hinged door which opens towards the exterior;

said unloading door further incorporating a flange integral with a bottom of the door and extending inwardly toward a bottom of the container over substantially a whole width or compartment thereby forming the bottom of the compartment along with the floor sloped downwards; and a means for opening and closing said top hinged door.

8. The apparatus of claim 1, further comprising an open top portion wherein upper edges of the side and end walls are provided with means for engaging the edges of a cover for closing the top of the containers compartments.

9. The apparatus of claim 1, further comprising foldout steps attached to the exterior of the container near the bottom of the container walls.

10. The apparatus of claim 1, further comprising the fixed partitions which extend upwards beyond an imaginary plane created by an upper rim of the side walls and rear and forward end walls, extensions of the fixed partitions providing added storage space between the containers and further providing frames for supporting a cover on top of the container.

11. The apparatus of claim 10, wherein the fixed partition extensions further comprise trapezoidal structures for providing a framework for the container cover.

12. The apparatus of claim 1, wherein the container comprises five compartments: the rear remote compartment incorporating a rearward opening door adjacent a bottom of a sloping floor in said rear compartment, the forward remote and intermediate compartments each having floors sloped towards the sides of the container, wherein two of these compartments slope to one side of the container while the other two compartments slope to the opposite side of the container.

13. The apparatus of claim 1, further comprising a container having six individual compartments:

the rear remote compartment of the container incorporating a rearward opening door positioned adjacent a bottom of the sloped floor of the compartment;

the forward remote compartment incorporating a frontwardly opening unloading door positioned adjacent a frontward downward sloped floor of the forward remote compartment;

four intermediate compartments each having side to side sloped floors and side unloading doors adjacent bottoms of the slopes, wherein two of the intermediate compartments unload on one side of the container, while the other two compartments unload on the opposite side.

14. The apparatus of claim 1, further comprising a container having four individual compartments:

the rear remote compartment of the container incorporating a rearward opening door positioned adjacent a bottom of the sloped door of the compartment;

the remote compartment incorporating a frontwardly opening unloading door positioned adjacent a frontward downward sloped floor of the forward remote compartment;

two intermediate compartments each having side to side sloped floors and side unloading doors adjacent bottoms of the slopes, wherein one of the intermediate compartments unloads on one side of the container, while the other compartment unloads on the opposite side.

15. A mobile collector sorter apparatus for collecting and sorting recycling waste, comprising a container of substantially rectangular shape having forward and rear walls and first and second side walls;

said container having plural fixed partitions transversely connected from the first side wall to the second side wall, thereby prescribing plural individual compartments within the container;

said compartments incorporating sloped floors with different angles of inclination;

said compartments also incorporating plural doors in the sides of each compartment of the container wherein the doors are specific to individual compartments to thereby provide intercommunication with the exterior of the container, at least one of said doors hinged at the bottom of the sloped floors of the compartments for unloading;

said sloped floor of each compartment provided by an inclined plane extending from a bottom at one side to an elevated portion remote from that side, wherein an outwardly opening unloading door located above a bottom of each compartment is located at a lower portion of the inclined plane to thereby provide a means for intercommunication of a lowest part of the inclined plane with an exterior of the container;

said container further comprising forward and rear remote compartments, at least one of which is intercommunicable with the exterior through an outwardly opening door hingedly mounted at a bottom of the container, wherein the sloped floor of said remote compartment is an inclined plane from an apex on a fixed partition downward towards the bottom of the wall adjacent the placement of the door when the door is in a closed position;

a hitch attached to forward wall of the container for engaging a powered tow vehicle;

and at least one axle positioned on a bottom of the container for allowing the container to be towed by said powered vehicle.

16. The apparatus of claim 15, further comprising an inclined plane of the sloped floor of each of the individual compartments having a fixed angle of inclination different from that of adjacent compartments to thereby provide a slope sufficient for emptying a particular type of recyclable waste wherein coefficients of friction for different wastes require different inclines for emptying waste material through a door adjacent a lower portion of a sloped floor.

17. The apparatus of claim 15, wherein said remote compartment further incorporating at least one loading door in a side wall for loading the compartment.

18. The apparatus of claim 17, wherein one of the remote forward and rear remote compartments does not incorporate a respective forwardly or rearwardly opening door, and the compartments intermediate the forward and rear remote compartments having single unloading doors at a bottom of a sloped floor and of the incline plane;

said remote compartment not incorporating a forwardly or rearwardly opening door further having at least one loading door for loading positioned at a higher level on the side of each compartment for loading each individual compartment.

19. The apparatus of claim 15, further comprising bottom hinged loading doors which open towards the exterior of the container wherein some of the bottom-hinged doors having a second hinge positioned parallel the first mentioned hinge, thereby forming double hinged loading doors;

said single and double hinged loading doors further having latches for engaging the side walls proximal points nearest tops of the side walls of the container wherein disengagement of the latches provides 180° outward rotation as prescribed by the single hinges on the single hinge doors or the second hinged on the double hinged doors;

said double hinge doors further having second side engaging latches located proximal to and below the second hinge wherein the disengagement of the second engaging means provides a 180° rotation of the portions of the double hinged doors intermediate the first and second hinge means;

said first and second hinges on double hinge doors providing a means for adjusting the size of loading apertures.

20. The apparatus of claim 14, wherein at least one of said remote compartments incorporates an outwardly opening unloading door hinged on a lower end of the wall opposite the fixed partition further comprising the door being a top hinged door which opens towards the exterior;

said door further incorporating a flange integral with a bottom of the door and extending inwardly toward a bottom of the container for substantially a whole width of the compartment thereby forming the bottom of the compartment along with the sloped floor; and a means for opening and closing said top hinged door.

21. The apparatus of claim 1, further comprising a container having six individual compartments:

the rear remote compartment of the container incorporating a rearward opening door positioned adjacent a bottom of a sloping floor of a compartment;

the forward remote compartment incorporating a side opening unloading door for a side to side sloped floor of the forward remote compartment;

four intermediate compartments each having side to side sloped floors and side unloading doors adjacent bottoms of the slopes, whereby two of the intermediate compartments unload on one side of the container, while the other two compartments unload on the opposite side.

22. The apparatus of claim 1, further comprising a container having four individual compartments:

the rear remote compartment of the container incorporating a rearward opening door positioned adjacent a bottom of a sloping floor of a compartment;

the forward remote compartment incorporating a side opening unloading door for a side to side sloped floor;

two intermediate compartments each having side to side slope floors and side unloading doors adjacent bottoms of the slopes, wherein one of the intermediate compartments unloads on one side of the container, while the other compartment unloads on the opposite side.

* * * * *